Aug. 12, 1924.
C. G. BLANCHARD
1,504,930
AUTOMATIC SCREW MACHINE
Filed Jan. 18, 1922   3 Sheets-Sheet 1
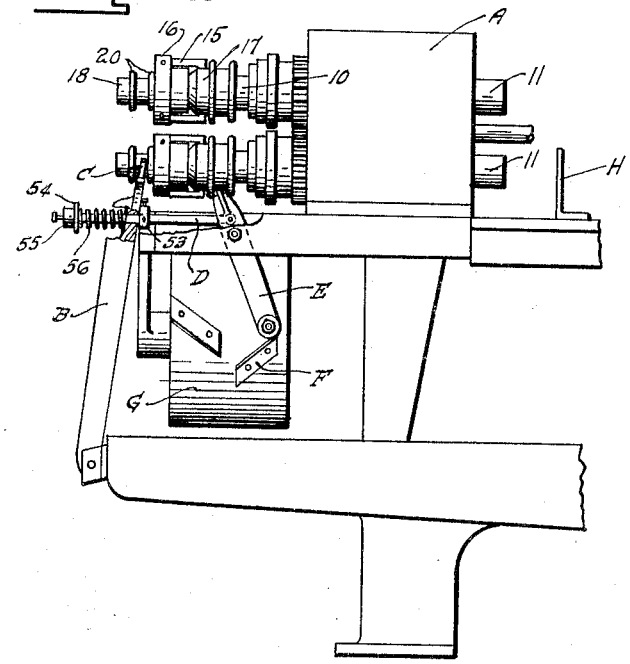
Inventor
C. G. Blanchard
By Watson E. Coleman
Attorney

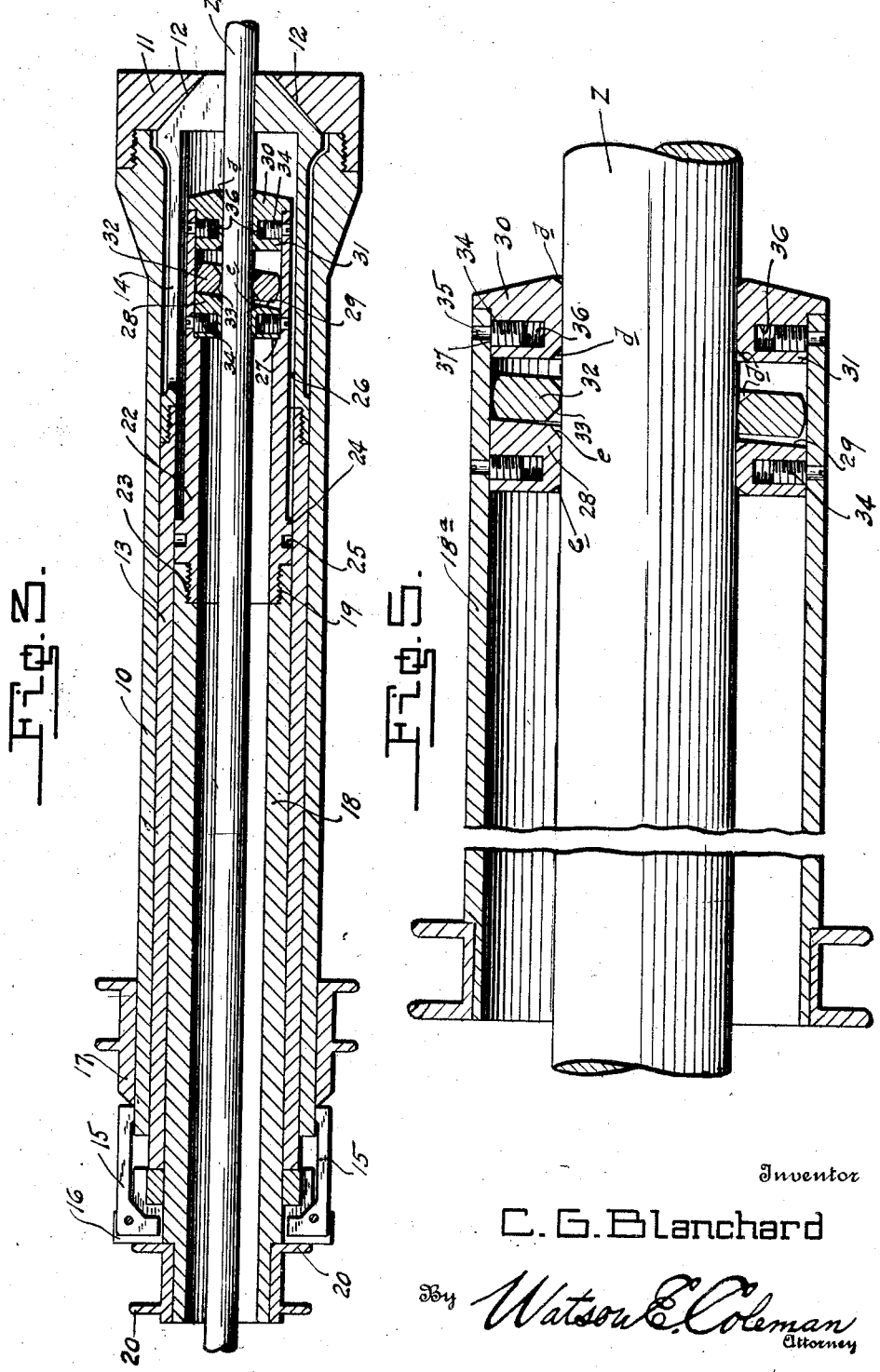

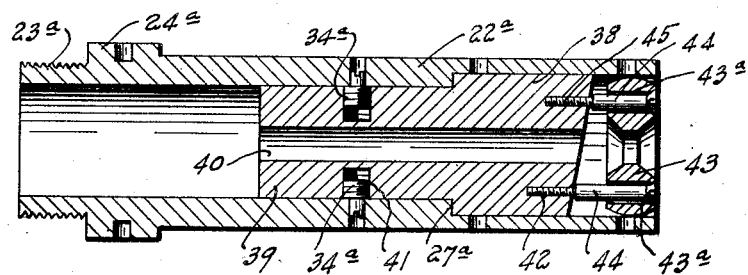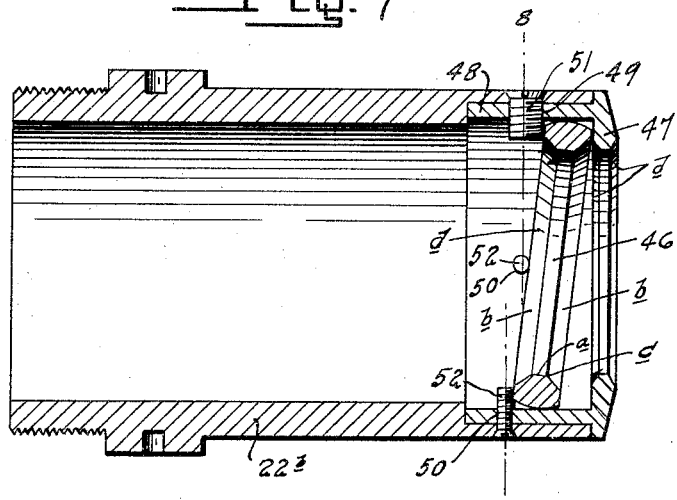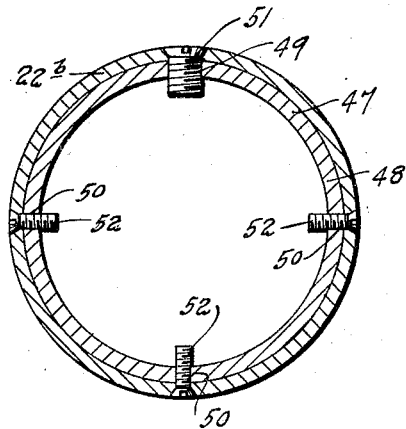

Patented Aug. 12, 1924.

1,504,930

UNITED STATES PATENT OFFICE.

CLAUDE G. BLANCHARD, OF ERIE, PENNSYLVANIA.

AUTOMATIC SCREW MACHINE.

Application filed January 18, 1922. Serial No. 530,165.

*To all whom it may concern:*

Be it known that I, CLAUDE G. BLANCHARD, a citizen of the United States, residing at Erie, in the county of Erie and State of Pennsylvania, have invented certain new and useful Improvements in Automatic Screw Machines, of which the following is a specification, reference being had to the accompanying drawings.

This invention relates to automatic screw machines, and particularly to the means for gripping and feeding the stock to the cutting tools.

All screw machines known to me, and particularly multi-spindle automatic screw machines, include for holding and feeding the stock a rotatable spindle having at its end a chuck hood, a push tube disposed within the spindle and having spring chucks adapted as the push tube is moved forward to engage the chuck hood and clamp upon the stock, and a feed tube within the push tube and through which feed tube the stock itself passes, having a feed chuck disposed within the spring chuck of the push tube, which feed chuck engages the stock upon a forward movement of the feed tube but slips over the stock upon a retraction of the feed tube.

When the stock has been fed forward to a position to be operated on by the die, the push tube is shifted forward to cause its spring jaws to be pushed forward and grip the stock, and when the screw has been formed and while it is being cut off the feed tube is retracted, its jaws slipping over the stock, this retraction being equal to the amount the stock is to be fed forward, that is equal to the length of the screw to be produced. Then the push tube is retracted, releasing its jaws, and the feed tube is fed forward, its jaws engaging the stock and carrying the stock forward until the stock strikes a feed stop commonly found on machines of this character.

The feed chucks on the feed tubes, feed shells or equivalent parts are expensive to make and last but a relatively short time. These feed chucks must be of the best material and workmanship in order to give any service of value, and the average efficient life of these chucks used under the best conditions is but three months. The upkeep cost and cost of renewal are excessive and at the rate of $20 a set for a four-spindle machine and the other relatively high losses due to feed chuck failure. The cost of these chucks will be obvious from the fact that they are made from solid stock and are turned to shape in a lathe and threaded to fit the feed tube while they are also drilled and bored to proper size and then the piece is placed in a milling machine and the metal is milled or cut away so as to form the gripping fingers. This milling operation is relatively long and requires the best of tools and workmanship. The piece is then placed in the fire and brought to the proper heat. The fingers are drawn together to the right amount and then re-heated and hardened. These operations require an artisan skilled in the art of tempering and handling the different tools and machines. The feed chuck thus formed is placed in service and usually shows its defects in a short time. It then has to be re-tempered and the fingers again closed up, and this retempering and closing up of the fingers occurs every few days thereafter until the feed chuck gives out entirely, either by the breaking of the fingers or because of the decreased efficiency of the metal to hold its shape and temper. The work on the feed chucks has to be done, as before stated, by a mechanic skilled in the art of handling the various production tools and these feed chucks have to be made and kept up by the tool room of the plant and cannot be made in the production department.

One of the objects of my invention, therefore, is to provide a new and very simple form of feed grip or chuck adapted to be associated with a specially designed master tube or shell or combined feed chuck and feed tube, this mechanism having the advantage that almost all of the parts constituting the feed chuck, feed tube, etc., can be made automatically by an automatic forming machine and easily assembled so that the feed grip may be produced without any special tools and its various sized grips can be automatically produced and heat-treated in large quantities, the gripping device being the only part which is hardened, and the design of this gripping device being such that it requires no spring or special tempering, pack hardening being all that is necessary in order to meet the requirements of service.

A further object is to provide a master tube or shell serving as a grip carrier and being of such construction that various sizes of grip devices may be used with a standard master tube or shell, thus doing away with the making of an entirely new shell for each size of stock used, thus greatly reducing the cost of upkeep and manufacture.

A still further object is to provide a stock gripping mechanism which admits of building stock or quantity-production multi-spindle automatic machines of larger capacity than those in general use at present. The capacities of automatic machines of the character stated are now limited by the grip obtainable upon the bar, or in other words it is almost impossible at the present time to make an automatic which will successfully handle stock larger than three or three and a half inches in diameter, as the feedchucks now used fail to grip the bar firmly enough to feed it forward in the machine. Machines of large capacity have been specially built but their general adoption on heavy bars has not been successful.

The gripping mechanism which I have devised and which I will hereafter describe is such that larger bars may be fed than are now capable of being handled by automatic machines and the principle of construction of the gripping mechanism is such that various sized bars of stock may be fed within the capacity of the machine and without changing the feed tubes or feed shells.

Another object is to provide a gripping device which is positive in its action and which will exert a gripping action upon the bar in proportion to the resistance to the forward movement of the bar of stock, and in this connection to provide means whereby the feed arm of the machine is forced forward in the usual manner but may be stopped when the stock has reached the feed stop even though the operator has accidentally set the machine for a longer stroke than he should have done without the breaking or damaging of any of the parts of the machine.

Still another object is to connect my stock gripping mechanism with the feed tube of the master shell of the machine by screws so designed that they cannot be forced outward beyond the surface of the feed shell or feed tube and thereby come in contact with the push tube, thereby causing the feed tube to stop and either breaking some part of the machine or stopping the machine.

Other objects have to do with the details of construction and arrangement of parts as will appear more fully hereinafter.

My invention is illustrated in the accompanying drawings, wherein:—

Figure 1 is a side elevation of the rear end of a standard multi-spindle screw machine showing my improvement applied thereto;

Figure 2 is a side elevation of the standard feed tube and feed shell or chuck;

Figure 3 is a longitudinal section of the spindle push tube, feed tube and feed shell assembled;

Figure 4 is an elevation of one of the back-up screws;

Figure 5 is a longitudinal section of the master shell, the gripping means and the shell being permanently connected with each other;

Figure 6 is a longitudinal section of a modified two-piece chuck for small work;

Figure 7 is a longitudinal section of another form of two-piece chuck;

Figure 8 is a section on the line 8—8 of Figure 7;

In Figure 1, I have illustrated the general features of a multi-spindle automatic screw machine, and in this figure A designates the head within which the spindles are mounted for rotation around a central axis so that the spindles may be indexed in the usual manner, these spindles being rotated by mechanism not necessary to describe and being adapted to be thrown into or out of operative engagement with the driving mechanism so that the rotation of the spindles may be stopped. It will be understood, of course, that as the head rotates the stock will be carried around in a series of steps so that a plurality of operations may be performed upon each bar of stock as it is rotated or indexed relative to the various tools. Inasmuch as the general construction of the machines are well known to those skilled in the art, it is not believed necessary to further describe the machine.

An individual spindle is designated 10 in Figure 3 and is illustrated as of ordinary construction and is provided at its forward end with the hood 11 which has screw-threaded engagement with the head of the spindle and which extends inward across the bore of the spindle and is provided with bevelled faces 12. Disposed within the spindle and longitudinally shiftable with relation thereto is the push tube 13 having thereon the spring chuck jaws 14 of usual type, the forward ends of these chuck jaws being bevelled so as to engage the bevelled faces 12. When the push tube 13 is shoved forward, the jaws will clamp upon the stock and when the push tube is retracted the jaws will spring outward away from the stock. The push tube is actuated by the usual angular fingers 15 pivotally mounted in the usual holder 16 and actuated by the sliding wedge 17. All these parts are well known and require no specific description. Disposed within the push tube 13 is the feed tube or feed shell 18.

I have illustrated in Figure 2 a standard feed tube, the forward end of this feed tube being interiorly screw-threaded, as at 19. The rear end of the feed tube carries upon it the flanges 20 constituting a "spool" and with which the feed arm B of the standard type of machine engages. This feed tube 18 about four inches from its forward end is formed with a spring finger 21 struck up from the material of the feed tube and springing outward. So far I have described the ordinary construction of the standard feed tube.

Illustrated as coacting with this standard feed tube is the master feed shell 22. The rear end of this shell is reduced in diameter and exteriorly screw-threaded, as at 23, to fit within and engage the screw-threads 19 of the standard feed tube. The largest diameter of the feed shell occurs just forward of the screw-threaded portion 23 so that there is formed a collar 24 which is adapted to abut against the end of the standard feed tube and have a diameter equal to the outside diameter of the standard feed tube. This collar or portion 24 is formed with spanner holes 25 whereby the feed shell may be put on or taken off the feed tube. Forward of this enlarged portion 24 the exterior diameter of the feed shell is reduced so as to leave a chip or clearance space 26 between the shell and the push tube. The rear portion of the feed shell has an internal diameter equal to the internal diameter of the standard feed tube 18 but the forward portion of the shell has its interior diameter increased from the shoulder 27 forward to the end of the shell.

Disposed within the forward portion of the shell and abutting against the shoulder 27 is a pressure ring 28. The inner face of this ring is trued so that it is disposed in a vertical plane and abuts against the shoulder 27 and the outer face of the ring is bevelled or inclined, as at 29. Disposed within the forward end of the shell 22 is the retainer, designated generally 30. This retainer has a portion 31 which is reduced in diameter so as to fit snugly within the end of the shell, the outer end of the retainer having an external diameter equal to the external diameter of the forward end of the shell, the internal diameter of this retainer being equal to the diameter of the largest sized stock which is intended to be operated on by the machine. The pressure ring 28 and the retainer 30 are held in place by screws extending through the wall of the shell and the confronting faces of the retainer and the pressure ring are spaced from each other a predetermined distance. Within this space is disposed a gripping ring 32 which has an external diameter slightly smaller than the internal diameter of the forward end of the shell and an internal diameter very slightly greater than the diameter of the stock Z to be operated on. The forward and rear faces of the ring are flat and parallel to each other but the inner face of the ring is oppositely bevelled or rounded, as at 33, and the outer face of the ring is rounded.

When the gripping ring 32 is in a vertical position it will lie flat against the inner face of the retainer 30 and under these circumstances it will permit the feed shell and the feed tube to be retracted, as the gripping ring will slide over the stock. Upon a forward movement of the feed tube and feed shell, however, the ring will engage the thicker portion of the pressure ring 28 causing the ring 32 to assume an angular position and cramp or bind upon the stock so that upon a forward movement of the feed tube and feed shell the stock will be gripped and fed forward. Thus it will be seen that this construction permits the free retraction of the feed tube and feed shell relative to the stock but positively grips the stock and causes a forward movement of the stock coincident with the forward movement of the feed tube and feed shell. It will likewise be seen that the gripping action of the oscillatable ring 32 is rendered greater in proportion to the resistance encountered by the stock.

While I do not wish to be limited to this, I preferably engage the pressure ring 28 and the retainer 30 with the wall of the feed shell by means of "back-up" or shoulder screws, one of which is illustrated in detail in Figure 4 and designated 34. This screw has an enlarged screw-threaded portion and a shank 35 of relatively small diameter, the end of which shank is notched. The screw hole 36 has a depth equal to the entire length of the screw 34 so that in inserting the pressure ring 28, for instance, within the shell 22, the screws 34 are turned down into the screw holes 36 such a distance that the outer ends of the screws will be below the surface of the pressure ring. Then the pressure ring is inserted and then an instrument is inserted through the screw hole in the feed shell to rotate the screws 34 outward until the shoulder of the screw 37 comes in contact with the inner face of the feed shell. Thus these screws 34 cannot project out beyond the outer surface of the feed shell under any circumstances. The same screws 34 are used with the retainer 31 and are applied in the same manner, it being understood, of course, that the screw holes in the feed shell are of the same diameter as the shank 35, while the screw holes in the retainer or in the pressure ring have a diameter equal to the screw-threaded portion of the screws 34. This construction eliminates all danger of the screws becoming unscrewed and projecting outward beyond the outer face of the shell 22 and into contact with the push tube. While this is the preferable way of holding the retainer and the pressure ring in place, I do not wish to be limited to this as it is obvious that other fastening devices might be used where desired.

In Figure 5, I have illustrated a master feed tube, that is a feed tube which has the pressure ring and retainer applied directly to the forward end of the tube. This master feed tube I have designated 18$^a$. The only difference between it and the standard feed tube 18 is that it is not screw-threaded at its forward end for engagement with a shell supporting the gripping mechanism but that the gripping mechanism is mounted directly in the forward end of the master feed tube. This gripping mechanism is precisely the same as heretofore described and, therefore, the retainer, the pressure ring and the gripping ring have all been given the same numerals as heretofore. Here also the pressure ring and retainer are held in place by the back-up or shoulder screws 34 previously described. Of course, these screws 34 are evenly spaced with relation to each other in both the feed shell and the feed tube. I have heretofore referred to the gripping ring as being bevelled or somewhat rounded upon its inner face, but by reference to Figure 7 it will be seen that this gripping ring is preferably formed with the inner face $a$ parallel to the axis of the ring and with oppositely disposed bevelled faces $b$ extending to the outer and inner faces of the ring respectively. Thus a sharp biting corner $c$ is produced which has biting and tight gripping engagement with the stock.

In Figure 6, I show a master shell which is particularly designed for small work and the capacity of which is approximately $\frac{9}{16}''$ round stock. The particular master shell shown is designed for the #515 Acme multi-spindle automatic screw machine. This machine produces from twelve hundred to twenty thousand pieces a day and is used on small work, such as making watch screws, camera parts, etc., which seldom exceed one inch in length. Figure 6 shows a two-piece gripping chuck and it has advantage on relatively small stock under a quarter-inch in diameter, inasmuch as it provides a relatively long support for the stock so as to prevent this relatively light stock from doubling or buckling. The master shell is designated 22$^a$ and is the same construction, except in size, as the master shell 22 illustrated in Figure 3 and is provided with the screw-threaded portion 23$^a$, the shoulder or enlarged portion 24$^a$, and the reduced portion in front of this shoulder. The chuck or gripping device for this shell as illustrated in Figure 6, comprises a support and bushing member designated generally 38. The largest diameter of this member is at its forward end so as to fit within the enlarged portion of the forward end of the feed shell 22$^a$ and bear against the shoulder 27$^a$ thereof. The rear portion of this bushing 38 is reduced in diameter, as at 39, and, of course, this bushing member is formed with a longitudinal bore 40 and is provided with screw holes 41 for the reception of the screws 34 previously referred to.

The forward end of this bushing 38 is bevelled relative to the longitudinal axis of the bushing and formed with longitudinally extending screw-threaded openings 42. The gripping ring 43 is of the same form as that heretofore described but has openings 43$^a$ for the passage of the screws 44, which openings are of such size as will permit the tilting of the ring 43 from a position at right angles to the longitudinal axis of the bushing to a position at less than a right angle thereto. The screw 44 as illustrated is formed with a shank having two diameters, the forward portion of the shank being smooth and provided with an outwardly flaring head, while the smallest portion of the shank is screw-threaded, as at 45, for insertion in the apertures 42. The holes 43$^a$ in the ring grip 43 have countersinks for the screw heads large enough to allow the ring to tip or rock upon the work or stock and take the gripping position upon the forward movement of the chuck. This arrangement provides a two-piece grip which can be slipped inside the master feed piece or shell and be held in place by the back-up or shoulder screws 34$^a$. It also provides a grip close to the chuck pads of the spindle and is as easily changed as the three-piece grip shown in Figure 5.

In Figure 7, I show another grip or feed chuck having but two parts. In this construction the bushing 38 is left off and its place is taken by a plurality of screws extending through the wall of the shell or feed tube and so disposed as to transmit the proper pressure to the gripping ring. In this drawing, 22$^b$ designates the shell which is constructed precisely the same as the shell shown in Figures 3 and 5, and disposed in the forward enlarged portion of this shell is the gripping ring 46 which is of the form previously described. Holding this ring in place within the shell is the annular retainer 47 which has the inwardly extending body portion 48 which fits within the forward enlarged portion of the shell. This body 48 is formed with four screw holes disposed equi-distantly apart, one of these screw holes 49 being relatively large in diameter and the other screw holes 50 being relatively small in diameter. It will be noted from Figure 7 that these screw holes 49 and 50 are disposed not directly opposite each other but in off-set relation. The shell is also formed with screw holes with which the screw holes holes 49 and 50 are adapted to register and through these screw holes pass the screws 51 and 52. The screw hole 50 is relatively large, being in actual practice one-quarter of an inch, while the screws 52 are relatively small, namely one-eighth inch screws. These screws 51 and 52 are disposed inward of the gripping ring 46 and act to transmit pressure to the gripping ring, this pressure being particularly transmitted by the relatively large screw 51. Upon a retraction of the feed tube or feed shell the ring 46 will swing flat against the inner face of the retainer 47 and upon a projection of the feed shell or feed tube the ring will swing to the position shown in Figure 7 against the screws 50 and 51 and will, of course, bite upon the stock. These screws, therefore, hold the retainer in place and at the same time constitute the abutment against which the gripping ring bears upon a forward movement of the feed screw. On account of the retainer extending inward nearly to the depth of the counter-bore or mouth of the shell, the grip ring must be of smaller outside diameter and this does not give the leverage obtainable in the constructions illustrated in Figures 3 and 5. Furthermore, this construction will not permit the use of "back-up" or shoulder screws 34 to hold the retainer in place. Again, there is no bushing such as is formed by the retainers illustrated in Figures 3 and 6 to steady the stock.

It will be understood that the feed tube or feed shell should have an inside diameter large enough to take stock the capacity of the machine or larger than the over size capacity of the machine and it should be long enough to extend from a point about 3/4" form the inside ends of the pads of the spindle chuck back to such a position that the spool formed by the flanges 20 will engage the feed shoe C on the feed arm B of the machine. At a point about 4½" from the grip end the feed tube should gradually taper about 1/16" in the 4½". It will be obvious that the gripping rings with their retainers, etc., are interchangeable and may be made of various sizes to fit within a standard sized feed tube or feed shell which is adapted to be applied to the feed tube. It is to be particularly noted that all of the pressure rings are formed with a countersunk throat $d$ on each face of the ring and that the retainer is also countersunk on each face, as at $e$. This permits the ready entering of the stock.

Multi-spindle automatic screw machines of a certain type, as for instance the Acme machines, are so constructed that the feed tube is shifted by the arm B (Figure 1) previously referred to, this arm B in turn being actuated by a feed rod D whose extremity is connected to a lever E pivoted intermediate its length and engaged by the strap cams F on a cam drum G. All of these parts are well known and are of standard construction and need no special description. It will be seen, therefore, that a positive feed forward of the feed tube is secured. In the ordinary type of machine, the stock is fed forward until it strikes a feed stop, designated H, and if the feed tube moves further forward the stock will slip within the ordinary gripping fingers of the feed tube chuck so that no harm will be done to the machine. In my construction, however, the chuck grips the stock so positively that it does not release and as a consequence some provision must be made to permit some part between the lever E and the gripping device to yield. To this end the rod D passes loosely through the arm B and carries upon it forward of the arm B the adjustable collar 53 and this rod D is extended rearward beyond its usual length and carries upon its ends a stop 54 of any suitable construction, as for instance a plate held in place by a nut 55, and between this plate and the arm B there is disposed the coiled compression spring 56. Now upon the forward movement of the feed tube under the action of the arm B, if the stock strikes the feed stop H before the feeding mechanism has completed its movement, the arm B will stop but the rod D will move on forward, simply compressing the spring 56, it being understood, of course, that this spring 56 is of such strength that it will not compress unless the forward movement of the stock and of the feed tube is prevented.

Assuming that the cut-off tool (not shown) is working on the stock and that the cam has operatively engaged the lever E to shift the upper end of this lever backward and shift the feed rod D back, then in this case the adjustment collar 53 comes in contact with the feed arm and the feed arm B moves backward, drawing the feed tube back over the stock, the ring grip having taken an upright position against the retainer. When the feed tube has traveled rearward the length of the feed and is ready for the reverse or feeding in movement, the cut off has finished its work upon the stock, the dies or chasers are retracted, and the feeding in cam has engaged the roller of the lever E to reverse the operation of the lever and thus starts shifting the feed tube forward, the ring grip immediately falling to a horizontal position and tightening upon the stock so that the stock moves ahead. The stock moves ahead until it strikes the feed stop H and the machine should be so adjusted that at this time the feeding in cam has stopped its action, but if the operator has set the feed adjustment collar 53 so as to force the feed tube back a greater distance than the piece just cut off, say a half inch, then in this case something would break, either the stock would be bent or the feed arm smashed or the feed cams broken but this extra travel is compensated for by the spring 56 which compresses under the excessive strain. It will be understood that this spring should be of such size that it will bring the work forward in the spindle without compressing but that it will compress upon itself under excessive strain when the work strikes or comes in contact with the stop. This compensating spring is only necessary in that type of automatic forming machine in which there is a positive forward feed of the feed tube and where my improved ring grip is used. It is not necessary on certain other types of automatic screw machines for the reason that in these other types the feed is not positive. Thus, for instance, in the Gridley type of automatic screw machine the feed tube is drawn back over the stock by means of power transmitted to the cams and the feeding in or forward movement of the stock is accomplished by weights which hold the work to the stop H until the clutch is closed on the stock. The Cleveland type of automatic uses a different arrangement which is governed by a spring. This spring is about two feet long and the feed rod extends through this spring back to the feed arm. Upon the feed rod is an adjustable ring with a roller attached which engages a cam on the cam drum. The cam forces the feed rod back, compressing the spring together, thereby storing energy enough in the spring to force the feed tube forward in the spindle as soon as the roller is released by the cam. Thus in neither of these machines is it necessary to provide the spring 56 which I have described, but in such a machine as the Acme if my positive gripping chuck is used it is necessary to provide the spring 56.

The operation of this mechanism has been stated heretofore and requires no further description, but attention is again called to the fact that the gripping device is applicable to the feed shells or feed tubes of all standard automatic screw machines, that the gripping chuck, as it may be termed, is of very simple construction, that it may be cheaply made, cheaply assembled, and that there are no parts of the chuck which are costly or require particularly expert handling. Furthermore, it is obvious that this gripping chuck may be made to engage work of various diameters and is interchangeable on the regular or standard feed tube or feed shell which forms the extension of the feed tube.

While I have illustrated a particular type of machine with which my device is associated, I do not wish to be limited to this as it is obvious that it may be used with other forms of machine and that it is applicable to other machines wherein it is necessary to feed forward a rod of stock intermittently.

I claim:—

1. A stock gripping feed chuck for forming machines comprising a hollow body, a gripping member having a central aperture adapted to embrace the work and tiltably mounted upon the body, and means permitting the member to move to a position at right angles to the axis of the body upon a movement of the body in one direction and permitting a movement into angular relation to the axis of the body upon a movement of the body in the other direction, said gripping member being longitudinally movable with the body.

2. A stock gripping feed chuck for forming machines adapted to embrace the stock and formed to provide an inclined abutment, a gripping member having a central stock aperture and disposed outward of said abutment, and means for retaining the gripping member in association with the abutment, said means permitting the gripping member to tilt from a position in contact with the inclined abutment into a position at right angles to the axis of the chuck, said gripping member being carried by the chuck.

3. A stock gripping feed chuck for forming machines comprising a hollow body through which the stock is adapted to pass, limiting means carried by the chuck and disposed in a plane diagonal to the longitudinal axis of the chuck, retaining means disposed outward of the limiting means and disposed in a plane at right angles to the axis of the chuck, and a stock gripping member having a central aperture disposed between the limiting means and the retaining means and having tilting movement from a position at right angles to the axis of the stock and against the retaining means to a position diagonal to said axis and against the limiting means, the points of closest approximation between the retaining means and the limiting means being slightly greater than the thickness of the gripping member.

4. A stock gripping feed chuck for forming machines comprising a hollow body, a gripping member having a central aperture carried upon the body for tilting movement, a retainer carried at the end of the body and adapted to permit the movement of the gripping member into a position at right angles to the axis of the body, and pressure transmitting means carried by the body inward of the retaining member and the gripping member and permitting the retaining member to tilt to a position diagonal to the axis of the body.

5. A stock gripping feed chuck for forming machines comprising a hollow body through which the stock is adapted to pass, an annular retainer disposed at the mouth of the hollow body and extending inward of said mouth, a gripping ring disposed within the mouth and inward of the retainer, said retainer having its inner face at right angles to the axis of the body, and pressure transmitting means mounted within the holow body inward of the gripping ring and adapted to transmit pressure thereto to permit said gripping ring to tilt from a position at right angles to the axis of the body to a position diagonal to the axis of the body.

6. A stock gripping feed chuck for forming machines comprising a hollow body through which the stock is adapted to pass, an annular retainer disposed at the mouth of the hollow body and extending inward of said mouth, a gripping ring disposed within the mouth and inward of the retainer, said retainer having its inner face at right angles to the axis of the body, and a pressure ring disposed within the hollow body inward of the gripping ring and having its outer face confronting the gripping ring inclined to the longitudinal axis of the hollow body, the points of closest approximation between the retaining ring and the pressure ring being spaced from each other a distance slightly greater than the thickness of the gripping ring.

7. A stock gripping feed chuck for forming machines comprising a hollow body through which the stock is adapted to pass, a gripping ring associated with the body and longitudinally movable therewith, the inner face of the gripping ring being oppositely bevelled and the middle portion of the inner face being at right angles to the central axis of the ring, means carried by the body and limiting the outward movement of the gripping ring and permitting the ring to assume a position at right angles to the axis of the body, and means limiting the inward movement of the ring and carried by the body, said means being disposed in a plane diagonal to the longitudinal axis of the body.

8. A stock gripping feed chuck for forming machines comprising a hollow body through which the stock is adapted to pass, a retainer connected to the outer end of the hollow body and extending inward partially over its bore and having a central aperture for the stock, a pressure ring disposed inward of the retainer and mounted upon the body, that face of the pressure ring confronting the retainer being disposed at an inclination to the longitudinal axis of the body, and a gripping ring disposed between the retainer and the pressure ring having its inner face formed with a medial portion at right angles to the axis of the ring and bounded by the reversely angled portions, the pressure ring and the retainer being spaced apart at their points of closest approximation a distance slightly greater than the thickness of the gripping ring.

9. A stock gripping feed chuck for forming machines comprising a hollow body through which the stock is adapted to pass, a retainer ring detachably mounted at the mouth of the hollow body and extending centrally inward, a pressure ring disposed within the hollow body inward of the retainer and detachably engaged with the body, the pressure ring having its face confronting the retainer ring disposed in a plane diagonal to the axis of the body, and a gripping ring disposed between the pressure ring and the retaining ring and tiltable in said space from a position at right angles to the axis of the body and against the inner face of the retaining ring to a position at less than a right angle and against the inclined face of the pressure ring.

10. A stock gripping feed chuck for forming machines comprising a hollow body through which the stock is adapted to pass, a retainer ring detachably mounted at the mouth of the hollow body and extending centrally inward, a pressure ring disposed within the hollow body inward of the retainer and detachably engaged with the body, the pressure ring having its face confronting the retainer ring disposed in a plane diagonal to the axis of the body, a gripping ring disposed between the pressure ring and the retaining ring and tiltable in said space from a position at right angles to the axis of the body and against the inner face of the retaining ring to a position at less than a right angle and against the inclined face of the pressure ring, and screws holding the pressure ring and retainer ring in place, said screws having shanks of smaller diameters than the screws, the screw openings in the pressure ring and retaining ring being sufficiently deep to permit the screws to be turned down entirely within said rings when the rings are inserted into the body, the shoulders formed at the base of said shanks preventing the outward movement of the screws beyond a predetermined point, said shanks having a length equal to the thickness of the wall of the body.

11. A feed tube for automatic screw machines having at its rear end a spool whereby the feed tube may be longitudinally shifted, a retainer ring detachably mounted at the opposite end of the feed tube, the inner face of the retainer ring being at right angles to the axis of the feed tube, a pressure ring detachably mounted within the feed tube inward of the retainer ring and having its face confronting the retainer ring disposed at an inclination to the axis of the tube, and a gripping ring disposed in the space between the pressure ring and retaining ring and having tilting movement in said space.

12. In an automatic screw machine, a feed tube interiorly screw-threaded at its forward end and a tubular shell adapted to form an extension of the feed tube, said shell at its rear end being exteriorly screw-threaded for engagement with the screw-threads of the feed tube and having a shoulder bearing against the end of the feed tube, a retaining ring disposed in the forward end of the feed tube and detachably engaged therewith and having its inner face at right angles to the axis of the feed tube, a pressure transmitting ring disposed inward of the retaining ring and detachably engaged with the feed tube and having a space confronting the retaining ring disposed at an inclination to the longitudinal axis of the feed tube, and a gripping ring disposed in the space between the retaining ring and the pressure ring and having a tilting movement from a position against the face of the retaining ring to a position against the face of the pressure ring.

13. In a screw machine of the character described, a feed tube adapted to embrace the stock, positively engaging stock gripping means mounted in the forward end of the feed tube, and gripping the stock upon a forward movement of said means relative to the stock, a stop arranged in the path of travel of the stock, and means for shifting the feed tube toward the stop including a power transmitting rod, positively operating means engaging the rod and forcing it forward, and a compression spring carried by the rod and operatively engaging the feed tube, said spring having sufficient tension to transmit the power of the rod to the feed tube under normal circumstances but compressing upon a further movement of the feed rod after the stock has struck the stop.

14. In an automatic screw machine, a feed tube, means at the forward end of the tube positively gripping the stock upon a forward movement of the feed tube relative to the stock, a feed arm operatively engaging the rear end of the feed tube, a feed rod passing loosely through the feed arm, means causing the positive reciprocation of said rod in both directions, a coiled compression spring carried upon said rod and bearing upon the rear end of the feed arm, and an adjustment collar adjustably mounted upon the rod forward of the feed arm and against which the arm bears.

15. The combination with a tubular element having an opening formed therein and a member arranged within the tubular element and provided with a recess of greater size than said opening and alignable therewith, of an element disposed within the recess and longitudinally shiftable therein, said element having a reduced end adapted to extend into the opening of the tubular element, and means for maintaining the element in engagement with the inner wall of the tubular element.

16. The combination with a tubular element having an opening formed therein and a member arranged within the tubular element and provided with a screw threaded recess of greater size than said opening and alignable therewith, of a screw engaged in the recess and longitudinally shiftable therein, said screw having a reduced end adapted to extend through the opening of the tubular element.

17. The combination with a tubular element having an opening formed therein and a member arranged within the tubular element and provided with a screw threaded recess of greater size than said opening and alignable therewith, of a screw engaged in the recess and longitudinally shiftable therein, said screw having a reduced end adapted to extend through the opening of the tubular element, the upper end of the reduced portion of the screw being adapted for engagement by a tool inserted through the opening of the tubular element.

In testimony whereof I hereunto affix my signature.

CLAUDE G. BLANCHARD.